Sept. 7, 1965

A. F. BEHNKE 3,204,482

CAM SHAFT AND METHOD OF MAKING SAME

Filed Aug. 14, 1963

INVENTOR.
ARNOLD F. BEHNKE
BY
ATTORNEY

United States Patent Office 3,204,482
Patented Sept. 7, 1965

3,204,482
CAM SHAFT AND METHOD OF MAKING SAME
Arnold F. Behnke, Rosemead, Calif., assignor to Kay-Brunner Steel Products, Inc., Alhambra, Calif., a corporation of California
Filed Aug. 14, 1963, Ser. No. 302,159
9 Claims. (Cl. 74—567)

This invention relates to wheel brakes for vehicles and more particularly to a composite cam shaft assembly and to an improved more economical and superior method of making the same.

The invention is more particularly concerned with a cam shaft for use on motor vehicles of the heavy duty type such as trucks, trailers and miscellaneous off-the-road motor-propelled equipment commonly utilizing pneumatic boosters as actuators for the brake shoes. Such cam shafts employ a cam at one end of a shaft mounted parallel to the carriage axle and having the pneumatically actuated booster connected to the inboard end of the shaft. Rotation of such shafts acts through the cam to urge the brake shoes against the brake drum.

Heretofore such cam shafts have been made by forging the entire assembly and thereafter subjecting the forged assembly to heat treatment to increase its strength and wear-resisting characteristics. This mode of manufacture is a costly and time-consuming procedure and subject to wide variations in the properties of the end product due to the fact that each cam shaft is custom forged to size and shape and then heat treated as a whole.

It has also been proposed to form the cam head itself by a forging operation and then to weld the finished product to the end of the actuator shaft. The resulting cam shaft is quite unsatisfactory and exhibits characteristics varying widely from cam shaft to cam shaft. Not only is this product inadequate and widely varying as respects its strength but the welding operation adversely affects the heat treatment so essential to acceptable service life of the cam.

Another shortcoming of the almost universal forging mode of manufacturing cam shafts is that each of the many different operating environments require cam shafts of differing lengths and sizes. While the forging operation can be carried out in a manner to meet any design specifications, yet costly time delays are unavoidable when it becomes necessary to replace an unserviceable cam shaft. The demand is not sufficient to justify manufacture of the cam shafts on any except an intermittent basis, it being common practice to produce a sufficient number for current needs only. No more are made until a sufficient number of orders has been received to make it economically feasible to conduct another forging run. A few emergencies are inadequate justification to institute a production run with the result that costly and indefinite delays are commonplace.

The present invention seeks to avoid the foregoing and other shortcomings of prior practice and design proposals while at the same time providing a superior product at lower cost and readily fabricated to meet a wide range of sizes and operating environments.

These objectives are achieved according to the invention by accurately casting the cam head proper from high strength metal, such as steel, and welding a shaft of appropriate length in the tubular hub cast integral with the cam head. A relatively small range of casting sizes suffices to meet the need of all brake applications since a shaft of the proper length can be selected and welded to the hub of the cam.

Important savings are made possible by reason of the fact that only the cylindrical surface required for use as the support bearing for the casting need be smoothly finished. No machining or surface finishing operation is performed on any other surface of the casting save to harden the brake-shoe engaging surface for greater wear-resisting characteristics. The shaft proper may be standard shaft stock formed at one end with splines for coupling the same to the booster lever arm. The nonsplined end of the shaft is inserted into the hub, either partially or fully, and suitably welded in assembled position. It is even feasible to make all cam shafts of the maximum length required and to then cut the nonmachined end to length for assembly to the cam head at the time of installation in the brake assembly.

Accordingly, the primary object of the present invention is to provide a new and improved composite cam shaft assembly including a cast portion and a noncast shaft portion rigidly secured together, and to a new and improved method for making such a composite cam shaft unit.

Another object of the invention is the provision of a more economical, longer-lived and improved cam shaft unit having a cast cam head provided with a hardened peripheral surface and a splined shaft rigidly secured to the hub of the cam head.

Another object of the invention is the provision of a cast cam head having an integral hub conveniently formed for high strength welded assembly to the shaft proper and having an unfinished cast head surface-treated for greater wearing characteristics.

Another object of the invention is the provision of a method of making a composite cam shaft having a cast component and a noncast component rigidly welded together.

Another object of the invention is the provision of an improved brake assembly cam head formed as a unitary article of manufacture from cast steel devoid of machining except for a support bearing surface and featuring a flame-hardened peripheral surface on the cam portion thereof.

These and other more specific objects will appear upon reading the following specification and claims and upon considering in connection therewith the attached drawings to which they relate.

Referring now to the drawings in which preferred embodiments of the invention are illustrated.

Figure 1:
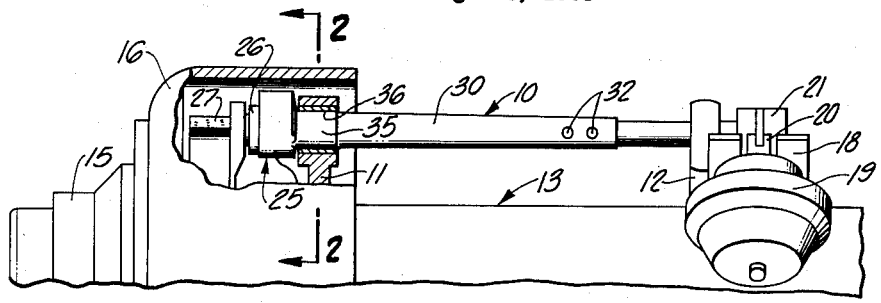
FIGURE 1 is a fragmentary side elevational view through a carriage axle and wheel brake therefor showing the cam shaft of this invention installed therein.

Referring first more particularly to FIGURE 1, there is shown a typical application environment of the invention cam shaft designated generally 10 and shown supported rotatably in a pair of brackets 11 and 12 suitably secured to carriage axle housing 13. Rigidly secured to the opposite ends of the axle, not shown, is a mounting facility 15 for a carriage wheel and a brake drum 16 equipped with suitable means for anchoring it to the carriage wheel.

Figure 2:
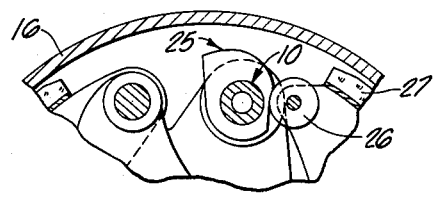
FIGURE 2 is a fragmentary sectional view taken along line 2—2 on FIGURE 1.

Likewise rigidly secured to axle housing 13 is a bracket 18 for a conventional type pneumatic brake booster 19 having its movable portion 20 connected to an operating arm 21 telescoped over the complementally shaped splined end of cam shaft 10. The unitary cast cam head 25 secured to the opposite end of the cam shaft has its peripheral surface bearing against a roller 26 (FIGURE 2) rotatably carried by brake shoe 27 and operates to expand the shoe against the surface of the brake drum in known manner.

Figure 3:
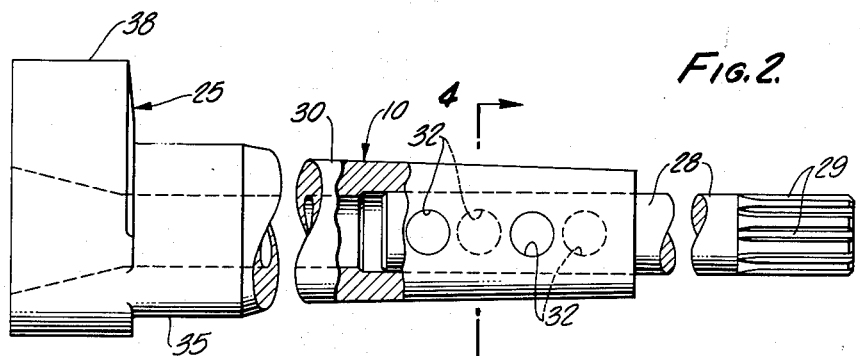
FIGURE 3 is a side elevational view on an enlarged scale of the cam shaft assembly per se according to one preferred embodiment of the invention.

Referring now more particularly to FIGURE 3, it is pointed out that the composite cam shaft unit 10 is formed entirely from two components, the one being a shaft 28 provided with splines 29 at its outer end and a one-piece unitary cast cam head 25. According to one preferred embodiment, the cam head is cast with an elongated tubular hub 30 formed with a plurality of weld holes having outwardly flaring sides with the holes being arranged in staggered relation axially and circumferentially of the hub. These are employed to provide a high strength welded connection between the shaft 28 and the hub. Welding is initiated between the surface of the hub and the side walls of ports 32 adjacent their inner ends and is concluded when the hole has been filled with the weld metal flush with the outer ends of the ports.

Of importance is the fact that the only surface finishing or machining operation performed on casting 25 is the counter-boring of the interior surface of the hub in contact with shaft 28 and the smoothing of cylindrical surface 35 journalled in a bearing liner 36 carried by a bracket 11. Desirably bearing surface 35 is located as close to the cam head as possible, although it will be understood it may be located anywhere along the length of the hub. Contrary to prior practice, no machining is performed on peripheral surface 38 of the cam proper other than to suitably harden this surface 38 to resist wear. Such hardening is conveniently and economically performed by well known flame hardening technique, although it will be understood that any suitable hardening process may be employed if desired within the scope of this invention. This operation is preferably performed after all welding has been completed in order that the heat of welding will not anneal or temper the hardened condition of the cam periphery.

Figure 5:
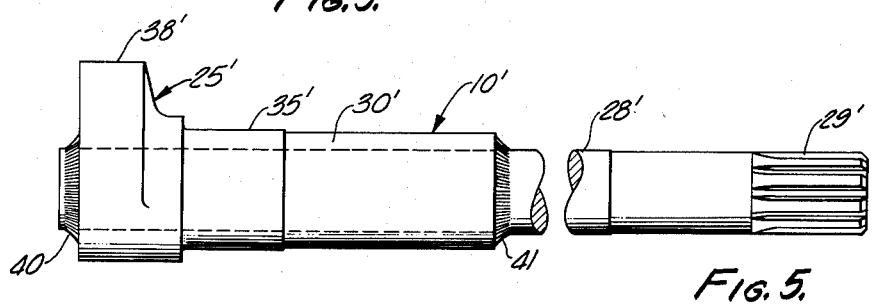
FIGURE 5 is a view similar to FIGURE 3 but showing an alternate preferred embodiment of the invention.
Figure 4:
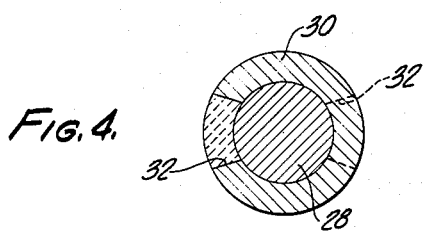
FIGURE 4 is a cross-sectional view taken along line 4—4 on FIGURE 3.

An alternate embodiment of the invention cam shaft is shown in FIGURE 5, the same or similar parts being there designated by the same reference characters employed above but distinguished by the addition of a prime. This embodiment differs from that shown in FIGURES 1 to 4 primarily in the omission of welding ports 32 used in welding the shaft to the hub of the cam head. Instead cam head 25' is provided with a tubular hub having a through passage of substantially uniform diameter throughout its extent. A somewhat longer shaft 28 is employed sufficiently long to extend through and desirably project slightly beyond the end face of the cam head. This projection facilitates completing an annular weld 40 between the outboard end of the cam shaft and the cam head. A second and similar weld 41 is formed between hub end 30' and shaft 28'. It is also pointed out that hub 30' has a finished bearing surface 35' which may be machined from the casting, or ground or finished in any other suitable manner. However, no other surface areas of the cam head are machined or finished except the above-described boring or reaming of the tubular hub and the heat treating of the peripheral rim of the cam head to surface harden it.

From the foregoing it will be apparent that the herein described improved composite cam shaft can be manufactured simply and expeditiously at low cost and assembled in such manner as to suit a wide range of operating conditions and size requirements. Forging is completely avoided and instead a simple and inexpensive casting operation is employed to make the principal component and all heat treating and hardening operations are confined to the actual surfaces in need of such treatment.

While the particular cam shaft and method of making same herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. That improved method of making a composite brake cam shaft assembly which comprises casting a unitary cam head and tubular hub therefor from high strength metal, forming a smooth-surfaced cylindrical bearing surface on the hub closely adjacent the junction of the cam and hub portions, flame hardening peripheral surface portions of said cam, inserting a shaft in one end of said hub formed with splines on its other end, and fuse-bonding said hub and shaft rigidly together.

2. That improved method of making a composite brake cam shaft assembly which comprises casting a one-piece cam and tubular hub from metal and having an axial passage opening at its ends through one end of said hub and one face end of said cam, finishing a cylindrical bearing surface on said hub between the opposite ends thereof, inserting a shaft having a splined end in one end of said hub, fuse bonding said shaft and hub together, and surface hardening peripheral surface portions of said cam subject to wear.

3. That improved method of making a composite brake cam shaft assembly which comprises casting a one-piece cam head and tubular hub having a continuous open-ended passage therethrough and including a plurality of cast-in weld access ports opening through the side wall of its hub portion, inserting one end of a shaft in said hub to a point inwardly of said weld access ports, welding said shaft to said hub in areas thereof exposed at said weld access ports, and surface hardening the rim of said cam.

4. That improved method of making a composite unitary brake cam shaft assembly which comprises casting a one-piece cam head and tubular hub having an open ended axial passage through both said hub and said cam head, inserting a snug-fitting shaft through said passage for substantially the full length of said passage, and welding said shaft to said casting at the opposite ends of said passage.

5. That improved method of making a composite brake cam shaft assembly which comprises casting a one-piece cam head and tubular hub formed with a plurality of cast-in outwardly flaring welding ports arranged in staggered relation to one another about said hub, said hub being adapted to be assembled to splined shafts of different lengths as necessary for installation of said cam shaft assembly on a particular brake-equipped carriage unit, inserting the nonsplined end of a particular shaft in said hub, and progressively welding the same to the hub in areas exposed at the inner ends of said welding ports.

6. An article of manufacture comprising a one-piece cast cam head and hollow hub unit all surfaces of which remain rough cast and unmachined except for a cylindrical smooth-finished surface between the opposite ends of said hub, a rolled steel shaft telescoped into one end of said hub and rigidly secured thereto by welding, the outer end of said shaft having splines therein to facilitate coupling the cam shaft to an actuator device, and the rough-cast peripheral rim surface of said cam head being surface hardened to resist wear.

7. An article of manufacture comprising a one-piece cast cam head and hollow hub unit all surfaces of which remain rough cast and unmachined except for a cylindrical smooth-finished surface between the opposite ends of said hub, said hub having cast therein a plurality of outwardly flaring welding ports through the wall thereof and arranged in staggered relation about the circumference of said hub, a steel shaft held rigidly assembled in said hub by welding substantially filling said weld ports, said shaft having an irregularly shafted outer end for interlocking assembly to an actuator device for said cam shaft, and the rim portions of said cam head having its rough-cast surface portion hardened to resist wear.

8. An article of manufacture comprising a unitary one-piece cast cam shaft head unit having a tubular hub integral with one face thereof, said cast cam head being devoid of finish machining except for the interior of its tubular hub and a cylindrical bearing surface on its exterior intermediate the ends of said hub, said hub projecting perpendicularly from one end of the cam proper and adapted to seat one end of a shaft therein, and the rough-cast peripheral rim of the said cam proper being surface hardened to resist wear.

9. An article of manufacture as defined in claim 8 characterized in that said hub has cast-in weld openings through and distributed axially and circumferentially thereof for use in welding a shaft assembled within said tubular hub.

References Cited by the Examiner

UNITED STATES PATENTS

| | | | |
|---|---|---|---|
| 493,129 | 3/93 | Thompson | 74—567 |
| 2,242,158 | 5/41 | Wasson et al. | 148—151 |
| 2,415,324 | 2/47 | Wilson | 29—149.5 |
| 2,866,261 | 12/58 | Macku | 29—429 |
| 2,867,556 | 1/59 | Tegen | 148—151 |

BROUGHTON G. DURHAM, *Primary Examiner.*